United States Patent [19]

Perlman et al.

[11] Patent Number: 5,434,855
[45] Date of Patent: Jul. 18, 1995

[54] METHOD AND APPARATUS FOR SELECTIVE INTERLEAVING IN A CELL-SWITCHED NETWORK

[75] Inventors: Radia J. Perlman, Acton; Charles W. Kaufman, Northborough; Robert E. Thomas, Westboro; William R. Hawe, Peppeell, all of Mass.

[73] Assignee: Digital Equipment Corporation, Patent Law Group, Maynard, Mass.

[21] Appl. No.: 331,250

[22] Filed: Oct. 28, 1994

Related U.S. Application Data

[63] Continuation of Ser. No. 97,255, Jul. 23, 1993, abandoned.

[51] Int. Cl.6 .......................... H04J 3/26; H04L 12/56
[52] U.S. Cl. ..................................... 370/60.1; 370/61; 370/94.1
[58] Field of Search ..................... 370/60, 60.1, 61, 62, 370/94.1, 94.2, 94.3; 340/825.02, 825.03; 379/202

[56] References Cited

U.S. PATENT DOCUMENTS

| | | | |
|---|---|---|---|
| 4,630,260 | 12/1986 | Toy et al. | 360/60 |
| 4,939,720 | 7/1990 | Bakka | 370/60 |
| 4,947,387 | 8/1990 | Knorpp et al. | 370/60 |
| 5,016,159 | 5/1991 | Maruyama | 364/200 |
| 5,128,931 | 7/1992 | Yamanaka et al. | 370/60 |
| 5,287,346 | 2/1994 | Bianchini, Jr. et al. | 370/60 |
| 5,291,477 | 3/1994 | Liew | 370/60.1 X |
| 5,301,055 | 4/1994 | Bagchi et al. | 370/60.1 X |

OTHER PUBLICATIONS

Jul. 1992, Perlman, Radia, Addison-Wesley Professional Computing Series, pp. 253–255, *Interconnections-Bridges and Routers.*
Aug. 30, 1990, Schroeder, Michael D. et al, Systems Research Center, Palo Alto, Calif., *Autonet: a High-speed, Self-configuring Local Area Network Using Point-to-point Links.*
1988, Tanenbaum, A. S., *Computer Networks,* 2nd Edition, pp. 306–308.

Primary Examiner—Melvin Marcelo
Attorney, Agent, or Firm—A. Sidney Johnston; Charles J. Barbas

[57] ABSTRACT

A novel mechanism prevents interleaving of packet cells from different source nodes on the same multicast port group at switches of a multicast virtual circuit in a cell-switched network: however, different cells bound for different multicast port groups may be interleaved. The mechanism comprises specific routing information that is stored in each multicast group port entry of a forwarding table located within each switch of the multicast virtual circuit. The forwarding table also stores information relating to each multicast port group including a virtual circuit value for each port of the multicast group. The specific routing information is provided for each multicast port group entry to notify the switch when data traffic for a particular packet is pending through a port of the multicast group and when that data traffic ceases, i.e., when the "end-of-packet" is reached. This ensures that the packets may be correctly reassembled at the destination nodes.

6 Claims, 5 Drawing Sheets

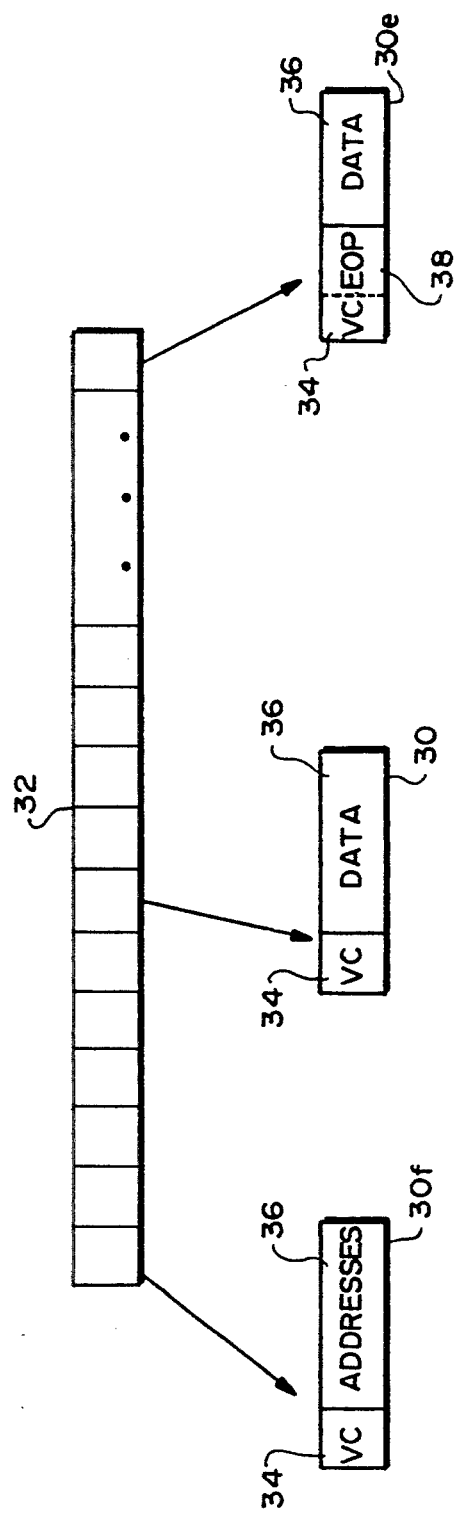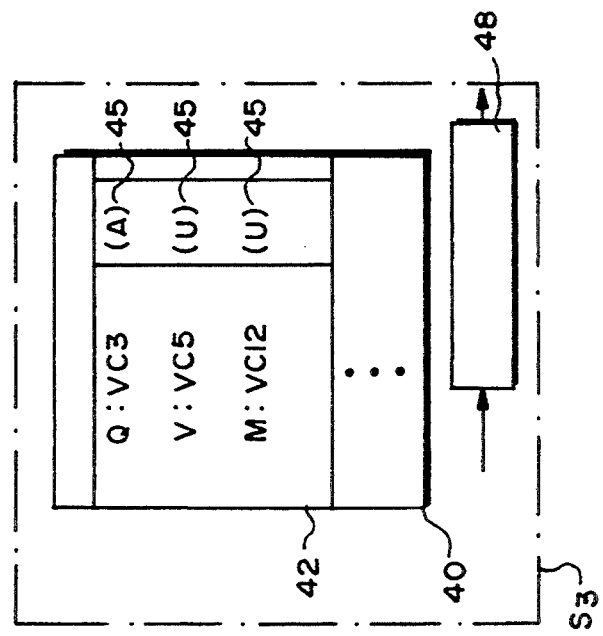
FIG. 3
FIG. 4

METHOD AND APPARATUS FOR SELECTIVE INTERLEAVING IN A CELL-SWITCHED NETWORK

This application is a continuation of application Ser. No. 08/097,255, filed Jul. 23, 1993, abandoned.

CROSS-REFERENCE TO RELATED APPLICATIONS

The invention is related to the following U.S. Patent Application assigned to the assignee of the present application: ARCHITECTURE FOR MAINTAINING THE SEQUENCE OF PACKET CELLS TRANSMITTED OVER A MULTICAST CELL-SWITCHED NETWORK, by Charles Kaufman et al., filed Jul. 23, 1993, Serial No. 08/096,096, now abandoned.

FIELD OF THE INVENTION

This invention relates generally to network systems and, more specifically, to multicast, cell-switched networks.

BACKGROUND OF THE INVENTION

A computer network typically comprises a collection of interconnected nodes, such as computer systems and switches, which may, in turn, be connected through an irregular configuration of transmission lines, i.e., links. The switches are specialized computers used to connect two or more links. Data is exchanged among nodes of such an "arbitrary-topology" network by passing packets from switch to switch over the links. Specifically, when a packet arrives on an incoming link, the switch decides onto which of the outgoing links that packet will be forwarded.

In a connection-oriented network, a virtual circuit is commonly established when exchanging packets between nodes of the network. The virtual circuit is a temporary logical path connection that requires a set up procedure to "open" the virtual circuit prior to transferring the data packets and a release procedure to "close" the circuit once the data transfer is complete. This obviates the need for effecting routing decisions for each data packet that is transferred between the nodes once the circuit is opened. In addition, the virtual circuit minimizes the overhead required for exchanging packets in the network by enabling use of a relatively short virtual circuit (VC) number in the header field of a packet instead of longer source and destination addresses.

For point-to-point communication, the set up procedure creates a virtual circuit by allocating certain switches and links in the network to establish the "best" route, according to conventional route configuration techniques, between a source node and a destination node. To illustrate, refer to FIG. 1A. Here, node A of network 10 performs a set up procedure to open a virtual circuit route that encompasses the switches $S_{A-D}$. This route is identified by a VC number, VC2, that is associated with node A's local switch $S_A$. In order to ensure that data packets subsequently transferred from node A always follow this virtual circuit route to node D, each switch along VC2 maintains a forwarding table with entries indicating where to forward the data packets in accordance with the routing configuration results.

FIG. 1B illustrates the forwarding tables 20a–d contained within the switches $S_{A-D}$, of the network 10. Each entry of the tables includes an incoming portion and an outgoing portion, with each portion including a port name and a VC number associated with that port. Each data packet transferred over the network contains a VC field identifying the open VC number on which it has arrived. Thus, when a packet is received at an incoming port of switch $S_C$, that switch searches the left (incoming) portion 22i of its table 20c, using the incoming port, e.g., Z, and VC number found in the packet. e.g., VC7, as the key. When a match is found, the outgoing portion 22o of the entry identifies the VC number, e.g., VC4, to insert into the VC field of the packet and the port, e.g., Q, to which it should pass the packet. It is thus apparent that the VC numbers and forwarding tables provide enough information to guide the data packets through the allocated switches and links to the destination.

Multicasting involves transmitting a single packet from a source node and having it received by a group of destination nodes. One way to implement this type of point-to-multipoint communication is via a "spanning tree", i.e., a subset of nodes and links in the network in which exactly one path is defined between any pair of nodes. The spanning tree is typically calculated by the nodes using conventional spanning tree algorithms. For example, when a multicast packet arrives at an incoming port of a switch, that switch checks a list of destination nodes contained in the packet to select a set of outgoing ports that will provide the best path to at least one of the destination nodes. This group of incoming and outgoing ports is called a multicast port group. The switch stores routing information relating to the multicast port group in its forwarding table.

Since each node maintains its own routing information, it can transmit an incoming multicast packet onto all spanning tree ports and links except the one on which the packet arrived; thus, the multicast packets traverse the tree to reach each destination node. Although this method makes excellent use of bandwidth, transmission of certain, high-priority packets through the network may be "delayed" because of the varying sizes of packets. For example, transfer of a high-priority, 10-byte packet through a multicast port group may be delayed until all bytes of a 100,000-byte packet are transferred through those ports.

In order to minimize this delay, some networks apportion each packet into mini-packets called cells. Each cell carries minimal addressing information, with the first cell containing the source and destination addresses, and all of the remaining cells containing merely a VC number. The cells do not contain information specifying the succession of the cells. Therefore, the sequence of the cells transmitted from a source node through a switch must be preserved in order to ensure that the cells can be reassembled into a complete packet at a destination node.

One way to ensure the order of transmitted cells is to prohibit simultaneous transfer of multicast packets through a switch. According to this approach, all outgoing ports selected by a switch for transfer of a multicast packet must be "free", i.e., there must be no data traffic flowing through the ports and over the links, before the packet can be forwarded over those links. If any of the outgoing ports are "busy", the multicast packet is stored in an internal buffer of the switch. Later, when all of the required ports are free, copies of the packet are transmitted over the links at once. However, this approach degrades the efficiency of the network, particularly because of the latency imposed on the transfer of different multicast packets through the switch.

Another approach for maintaining the sequence of cells transmitted over the network involves sending all multicast packets to a single point, i.e., a designated switch, which then forwards the cells, in succession, to their destinations. However, it is apparent that this approach may significantly decrease the throughput of the network.

Maintaining the order of transmitted cells is particularly significant in a multicast, cell-switched network with multiple sources. Because the virtual circuits of the network may have common destinations, packet cells from different sources propagating through a common multicast group of ports in a switch may have the same VC number. If the cells become interleaved, there is not enough routing information in the cells to reassemble them into complete packets at a destination node.

Therefore, it is among the objects of the invention to provide a novel method and apparatus for maintaining the sequence of packet cells transmitted from multiple sources in a cell-switched network.

SUMMARY OF THE INVENTION

The present invention resides in a novel mechanism by which switches of a multicast virtual circuit in a cell-switched network may prevent interleaving of packet cells from different source nodes at a common multicast group of ports. The mechanism comprises specific routing information that is stored in each multicast port group entry of a forwarding table located within each switch of the multicast virtual circuit. The forwarding table stores information relating to each multicast port group including, inter alia, a virtual circuit (VC) value for each port of the multicast group. The specific routing information, e.g., a bit of state, is provided for each multicast port group entry to notify the switch when data traffic for a particular packet is pending through a port of the multicast group and when that data traffic ceases, i.e., when the "end-of-packet" is reached.

For multicast virtual circuit operation, packet cells that arrive at one port of a multicast group are transmitted to all of the remaining ports of that group. In accordance with the invention, packet cells from different source nodes that are received at any of the ports of the multicast group of a switch and which are bound for the remaining ports of the multicast group are not interleaved; only different cells bound for different multicast port groups may be interleaved at the switch. This ensures that the packets may be correctly reassembled at the destination nodes.

For example, assume cells of a first packet arrive at a switch on one of its ports, i.e., the incoming port, associated with a first multicast port group. This incoming port's state bit is asserted to signal the reception of the cells and, as they are received, these cells are forwarded to the remaining ports of the first multicast port group for transfer to the destination nodes. If cells of a second packet arrive at any of the ports of the first multicast port group while the incoming port's state bit is asserted, forwarding of the second packet cells through the switch is inhibited. Once the first packet's end-of-packet cell is forwarded over the network, the switch deasserts the state bit of the incoming port and the second packet cells may be forwarded to the remaining outgoing ports of the first multicast port group.

On the other hand, if cells of a second packet arrive at a port of a second multicast port group while the state bit of the incoming port is asserted, those second packet cells may be immediately forwarded through the switch to the remaining ports of the second multicast port group. In order to impart "fairness" with respect to access through the switch, the second packet cells are interleaved with the first packet cells. Because the cells of each packet have distinguishable VC numbers, their order of transfer through the switch is preserved and reassembly of the cells into complete packets at their destination nodes is ensured.

BRIEF DESCRIPTION OF THE DRAWINGS

The above and further advantages of the invention may be better understood by referring to the following description in conjunction with the accompanying drawings, in which:

FIG. 3 illustrates the format of a cell used to exchange data among nodes of the network of FIG. 2:

FIG. 4 is a diagram of a forwarding table containing specific routing information in accordance with the invention:

DETAILED DESCRIPTION OF ILLUSTRATIVE EMBODIMENTS

Figures 1A, 1B:
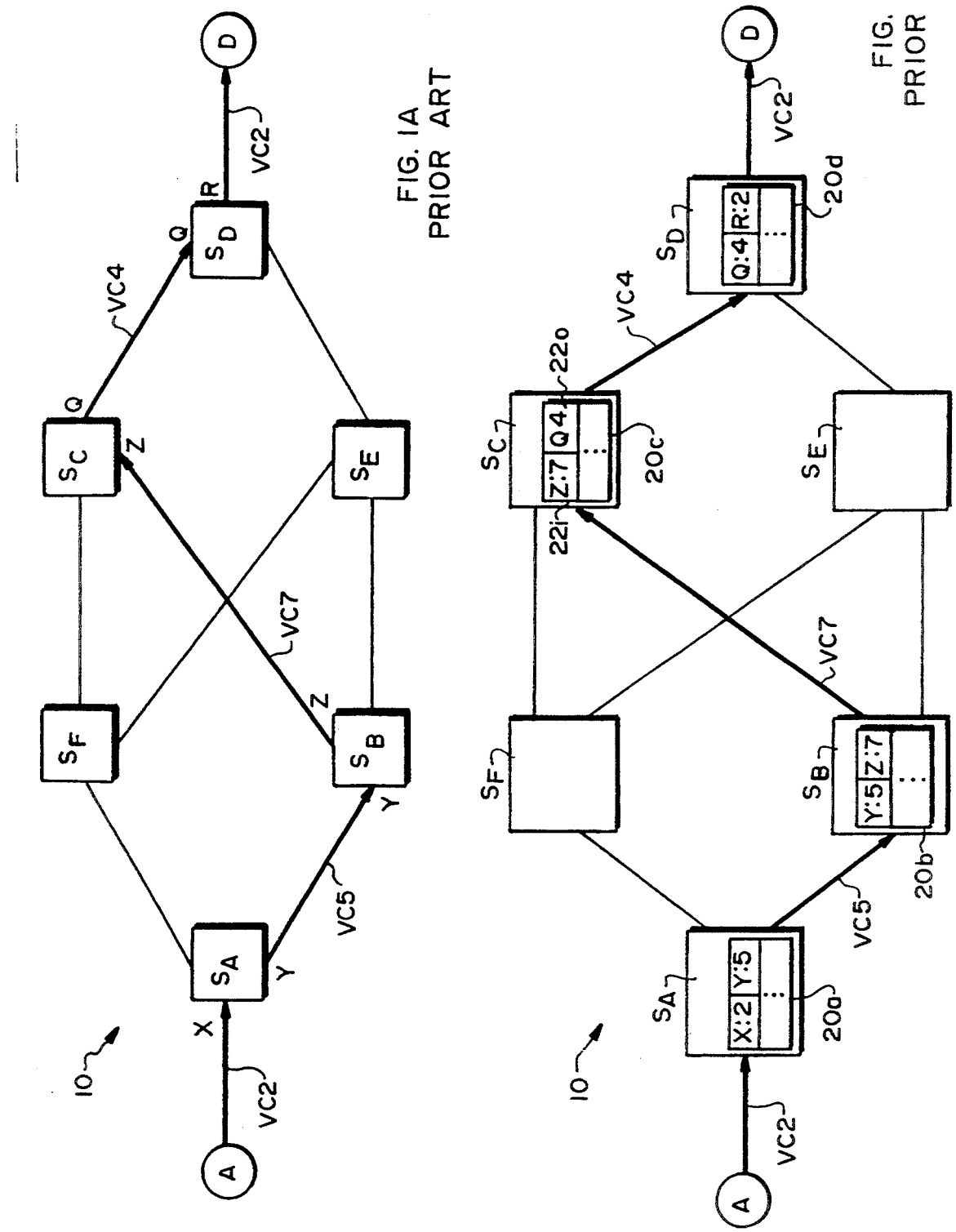
FIG. 1A is a diagram of a conventional point-to-point, virtual circuit connecting a source node and a destination node.
FIG. 1B is a block diagram of conventional forwarding tables and the information contained therein relating to the virtual circuit of FIG. 1A.
Figure 2:
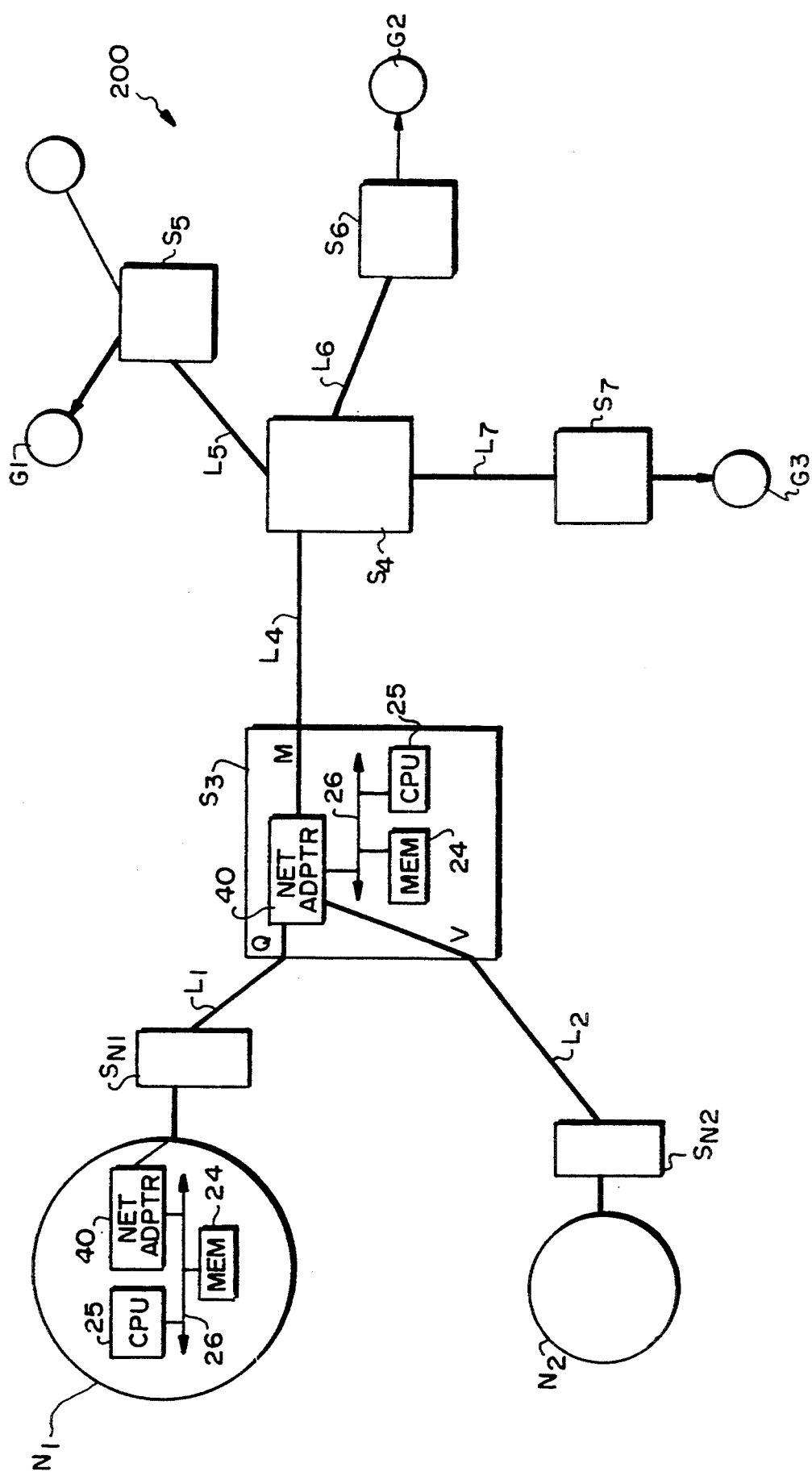
FIG. 2 is a diagram of a multicast, cell-switched network in which the novel mechanism of this invention may be advantageously used.

FIG. 2 depicts a multicast, cell-switched network 200 of interconnected nodes in which the novel mechanism of this invention may be advantageously used. The nodes are typically general-purpose computers comprising a plurality of source nodes N1-2 and a group of destination nodes G1-3. Each node is coupled to a respective "local" switch S, i.e., a specialized computer. Each switch S is configured to facilitate the flow of information in the network 200 by providing, along with its incoming and outgoing links L, connections between the source and destination nodes.

Each node and switch typically comprises a central processing unit (CPU) 25, a memory unit 24 and at least one network adapter 40 interconnected by a system bus 26. The main memory 24 may comprise storage locations typically composed of random access memory (RAM) devices, which are addressable by the CPU and network adapter. An operating system, portions of which are typically resident in main memory 24 and executed by CPU 25, functionally organizes the nodes and switches. The operating system invokes network operations in support of programs executing in the CPU 25.

As previously noted, a point-to-point virtual circuit is typically established between a source node and a destination node prior to transferring packets between the nodes. A multicast connection procedure provides a means for efficiently "opening" point-to-multipoint virtual circuits between a source node and a group of destination nodes by allocating certain switches and their connecting links to establish the best routes between the nodes. Selection is effected by conventional adaptive-type routing algorithms used in route configuration analysis.

Generally, when a packet is received at an incoming port of a switch, it is stored there until the routing determination is made as to which of the outgoing ports the packet will be forwarded. This group of incoming and outgoing ports is called a multicast port group, and the switches and links allocated to the point-to-multipoint virtual circuits are elements of multicast virtual circuits. Only the switches of the multicast virtual circuits need maintain routing information relating to the destination nodes.

For the multicast, cell-switched network 200 set forth in FIG. 2, each of CPUs 25 of the source nodes N1-2 executes the multicast connection procedure to open multicast virtual circuits to a predetermined group of destination nodes. If the destinations for each circuit happen to be nodes G1-3, elements of the multicast virtual circuits may overlap. That is, the multicast port group Q, V and M of switch $S_3$ may be common to the multicast virtual circuits established by source nodes N1 and N2.

In order to open the multicast virtual circuits, each source node N may create a multicast setup packet, MC_SETUP, containing a multicast identifier field, a virtual circuit (VC) field and a destination nodes field, the latter field identifying a list of desired destination node addresses. The source node N forwards the packet to its local switch $S_N$, which receives the packet on an incoming port and checks the list of node addresses to select a set of outgoing ports, each of which provides the best route to at least one of the destination nodes.

If more than one outgoing port is selected, a copy of the packet is forwarded to each port. Forwarding of the packet may introduce significant delay because of the varying sizes of packets transmitted through the network. In order to minimize this delay, some networks apportion each packet into mini-packets or cells. FIG. 3 illustrates the format of a cell 30.

Specifically, the source node N divides a packet 32 into a plurality of cells 30 prior to forwarding them, in sequence, over the network 200. Each cell 30 comprises approximately 53 bytes, including a 5-byte header field 34 and a 48-byte data field 36. Each cell contains minimal addressing information, such as a VC number, in the header field 34. In addition, the data field 36 of the first cell 30$f$ contains a source node address and a multicast address for the destination nodes, and the header field 34 of the last cell 30$e$ contains information, e.g., an "end-of-packet" (EOP) bit 38, indicating that it is the last cell of the packet 32.

The switch $S_N$ also generates entries in an internal forwarding table (see FIG. 4) for the newly-formed multicast group, with each entry containing, inter alia, routing information such as (i) the incoming port and its associated VC value acquired from the VC field and (ii) the selected outgoing ports and their associated VC values. Prior to forwarding the packets through the outgoing ports and onto the network, the switch $S_N$ updates the VC field of each packet to store the VC value associated with each selected outgoing port and modifies the destination field to store only those destinations using that particular port. This procedure is repeated at each switch of the multicast virtual circuits until each packet identifies only one destination.

At this point, the multicast virtual circuits are effectively "opened". Since each switch of the multicast virtual circuits maintains routing state relating to the multicast group of destination nodes, data packets subsequently issued by the source node N need only contain the initial local VC value in order propagate along each virtual circuit and arrive at the respective destination nodes.

When dividing a packet into cells and transmitting the cells from switch to switch, it is important that the sequence of these cells be preserved so that they can be reassembled into a complete packet at a destination node. This is particularly significant in a cell-switched network having multicast virtual circuits because certain elements of different packets may overlap and have the same VC numbers. If cells of different packets propagating through a common multicast port group of a switch become interleaved, there is not enough routing information in the cells to reassemble them into complete packets at a destination node.

In accordance with the present invention, a novel mechanism is provided by which switches of a multicast virtual circuit may prevent interleaving of cells from different source nodes on the same multicast port group. The mechanism comprises specific routing information that is stored in each multicast port group entry of the forwarding table located in each switch of the multicast virtual circuits. FIG. 4 is a diagram of a forwarding table 40 of the switch $S_3$ containing the specific routing information of the invention. This information, e.g., a state bit 45, is provided for each multicast port group entry 42 to notify the switch when data traffic for a particular packet is pending through a port of the multicast group and when that data traffic ceases. The latter condition occurs as a result of the switch's CPU examining an asserted "end-of-packet" bit 38 of a cell 30$e$.

The state bit 45 may be implemented as a flag which, when asserted, may indicate that a "multi-cell packet is being transmitted through this port". Alternately, the bit may be a variable which may indicate that "this link is committed". If a flag is used, only one flag may be asserted (A) at a time. It will be apparent to those skilled in the art that other similar or equivalent means for implementing the state bit may be employed within the teachings of the invention. Notwithstanding the specific implementation, the mechanism allows interleaving of different packet cells among different multicast groups.

For example, assume flags are used to implement the state bits 45. Initially, all the flags are unasserted (U) and a cell 30 arrives at port Q with a virtual circuit number VC3. Accordingly, the flag associated with port Q:VC3 is asserted (A). This particular cell 30 and the remaining cells of the packet are forwarded to the remaining ports of the multicast port group, i.e., port V with VC5 and port M with VC12. If different packet cells arrive at port M with VC12 while the flag associated with port Q:VC3 is asserted (A), these different packet cells are not forwarded and may, in fact, be stored in an internal buffer 48. When the switch $S_3$ receives a cell 30$e$, i.e., the end-of-packet cell, at port Q with VC3, the flag associated with port Q becomes unasserted and the different packet cells are forwarded to the remaining ports of the multicast port group.

Figure 5:
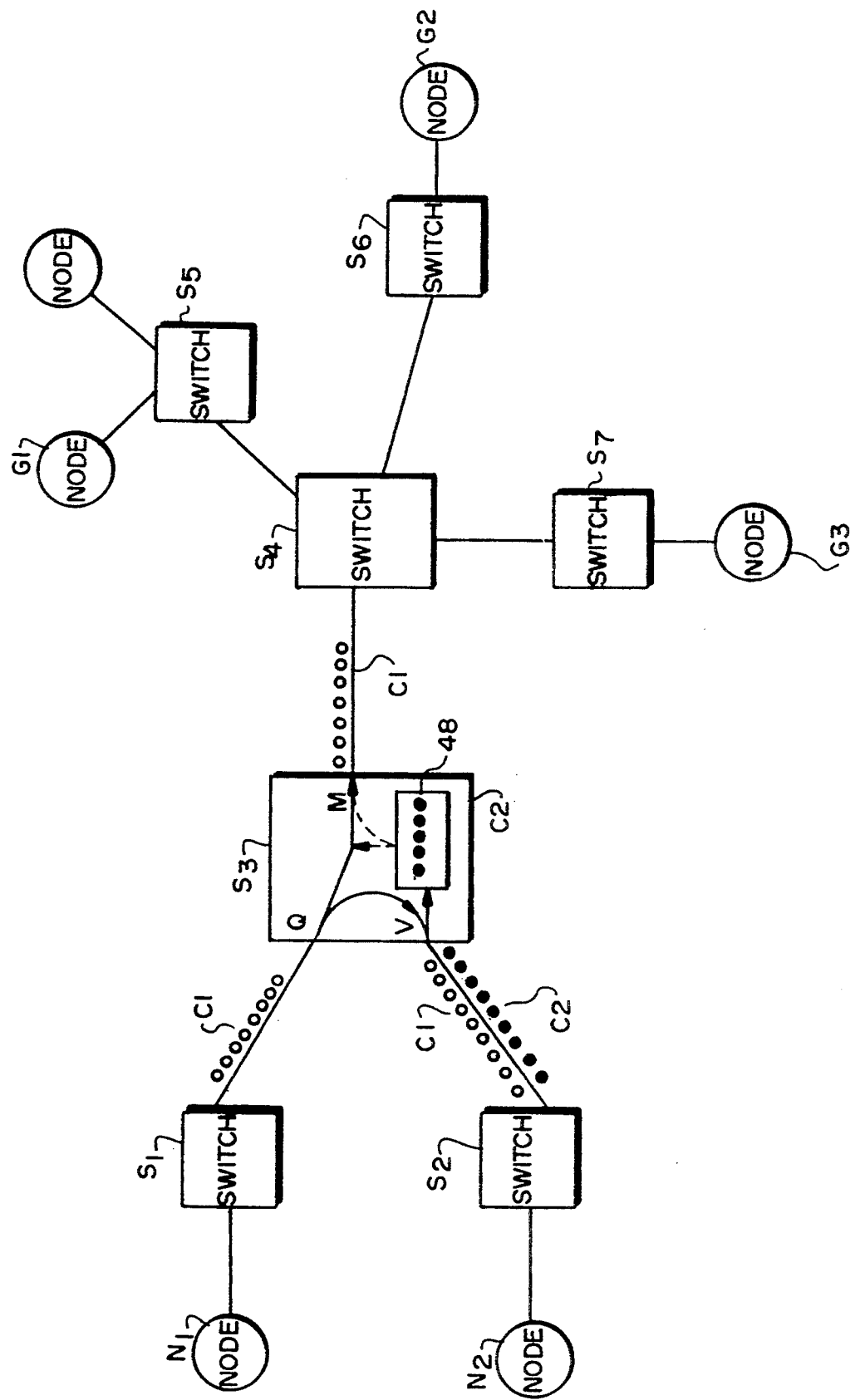
FIG. 5 illustrates an example of inhibiting interleave of different packet cells at a common multicast port group of a switch in accordance with the invention.

FIG. 5 illustrates an example of inhibiting interleave of different packet cells at a common multicast port group. Assume cells C1 of a first packet arrive on one of the ports, i.e., the Q port, associated with a first multicast port group at switch S₃. This Q port's state bit 45 is asserted to signal the reception of the cells C1 and, as they are received, these cells C1 are forwarded to the remaining ports V and M of the first multicast port group for transfer to the destination nodes. If cells C2 of a second packet arrive at port V of the first multicast port group while the Q port's state bit is asserted, forwarding of the second packet cells C2 through the switch S₃ is inhibited, e.g., by issuing a "stop send" message to the forwarding node/switch or by storing these cells C2 in internal buffer 48. In the illustrative embodiment of the invention, the internal buffer may be a first-in, first-out (FIFO) buffer. Once the first packet's last, end-of-packet cell 30e is forwarded over the network, the CPU 25 of switch S₃ deasserts the state bit 45 of the Q port and the second packet cells C2 are forwarded to the remaining outgoing ports Q and M of the first multicast port group.

Figure 6:
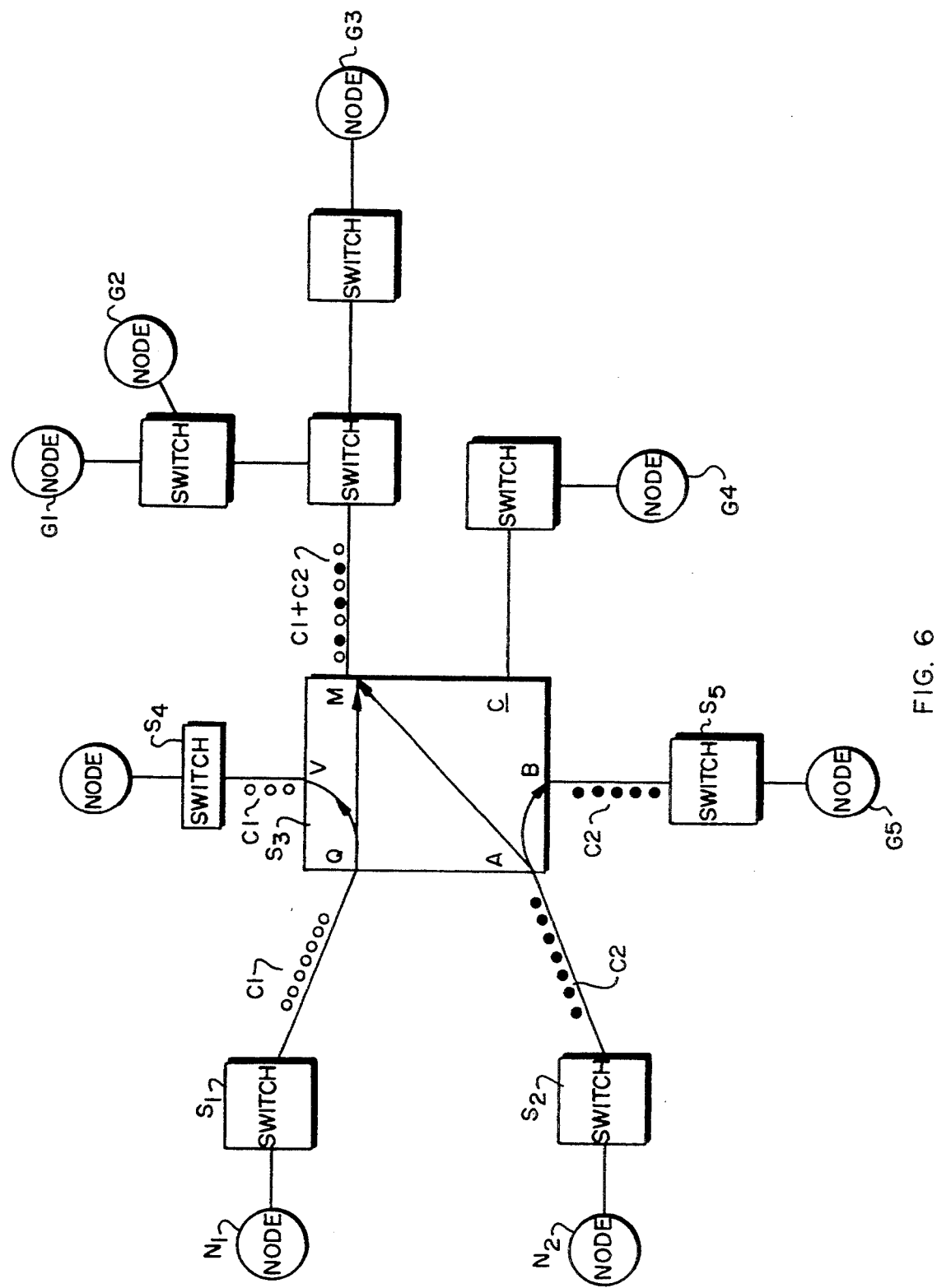
FIG. 6 illustrates an example of selectively interleaving different packet cells at different multicast port groups of a switch in accordance with the invention.

In contrast, FIG. 6 illustrates an example of selectively interleaving different packet cells at different multicast port groups of the switch S₃. If cells C2 of a second packet arrive at a port A of a second multicast group comprising ports A, B and M, while the state bit 45 of the Q port is asserted, i.e., an indication that a "multi-cell packet is being transmitted through this port" to the remaining ports V and M of the first multicast port group Q, V and M, those second packet cells C2 are immediately forwarded through the switch S₃ to the remaining ports B and M of the second multicast port group. In order to impart "fairness" with respect to access through the switch, the second packet cells C2 are interleaved with the first packet cells C1 at the port M. Because the cells of each packet have distinguishable VC numbers in their header fields, their order of transfer through the switch is preserved and reassembly of the cells into complete packets at their destination nodes is ensured.

In summary, the invention set forth herein increases the overall efficiency of a cell-switched network by selectively interleaving cells at switches of the network. Specifically, packet cells from different source nodes that are received at any of the ports of a multicast port group of a switch and which are bound for the remaining ports of the multicast group are not interleaved; only different cells bound for ports of a different multicast port group may be interleaved. This technique maximizes throughput of the network by allowing different packet cells to be interleaved at ports of a switch when it can be ensured that the packets may be correctly reassembled at the destination nodes.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. Apparatus for inhibiting interleave of packet cells transferred from a plurality of source nodes to a plurality of destination nodes by way of a multicast virtual circuit in a cell-switched network, said apparatus comprising:
   a plurality of links connected to each of said source nodes and destination nodes; and
   at least one switch for interconnecting said links, said switch having a plurality of ports associated with a multicast port group and corresponding to said destination nodes, said switch further having a table with entries for storing specific routing information associated with said multicast port group, said specific routing information indicating when packet cells from one of said source nodes are passing through one of said ports to remaining ones of said ports of said multicast group,
   whereby said switch, in response to said specific routing information, inhibits packet cells transferred from another of said source nodes from passing through any of said ports of said multicast port group while said packet cells from said one of said source nodes are passing through said ports of said multicast port group.

2. The apparatus of claim 1 wherein said specific routing information further indicates when passing of said packet cells through said one of said ports ceases.

3. The apparatus of claim 2 wherein said specific routing information comprises a state bit provided for each multicast port group entry.

4. The apparatus of claim 2 wherein said specific routing information comprises a flag provided for each multicast port group entry.

5. The apparatus of claim 4 wherein said flag indicates passing of said packet cells through one of said ports ceases in response to an end-of-packet cell received at said one of said ports.

6. A method for inhibiting interleave of packet cells transferred from a plurality of source nodes to a plurality of destination nodes by way of a multicast virtual circuit in a cell-switched network having a plurality of links connected to each of said source nodes and destination nodes, said network including at least one switch for interconnecting said links, said switch having a plurality of ports associated with a multicast port group and corresponding to said destination nodes, said method comprising the steps of:
   storing specific routing information associated with said multicast port group in entries of a table of said switch;
   asserting said specific routing information to indicate when packet cells from one of said source nodes are passing through one of said ports to remaining ones of said ports of said multicast group; and
   inhibiting, in response to said asserted specific routing information, packet cells transferred from another of said source nodes from passing through any of said ports of said multicast port group while said packet cells from said one of said source nodes are passing through said ports of said multicast port group.

* * * * *